United States Patent [19]
Yordy

[11] 3,756,326
[45] Sept. 4, 1973

[54] MOUNTING DEVICE

[76] Inventor: Russell D. Yordy, Rt. 2, Morton, Ill. 61550

[22] Filed: Dec. 1, 1970

[21] Appl. No.: 94,078

[52] U.S. Cl.................. 172/298, 172/303, 172/307
[51] Int. Cl.......................................... A01b 59/044
[58] Field of Search.................... 172/298, 297, 300, 172/303, 307, 308, 276, 272, 273, 302

[56] References Cited
UNITED STATES PATENTS

| | | | |
|---|---|---|---|
| 2,302,477 | 11/1972 | Smith............................. | 172/307 X |
| 2,727,452 | 12/1955 | Abbott............................... | 172/298 |
| 2,966,220 | 12/1960 | Wenzel........................... | 172/303 X |
| 2,591,522 | 4/1952 | Dejoy................................ | 172/276 |
| 2,886,114 | 5/1959 | Peterson........................ | 172/307 X |
| 3,088,526 | 5/1963 | Swenson............................. | 172/297 |

*Primary Examiner*—Robert E. Pulfrey
*Assistant Examiner*—Stephen C. Pellegrino
*Attorney*—Hill, Sherman, Meroni, Gross & Simpson

[57] ABSTRACT

A mounting device for mounting an implement particularly a spring tooth harrow on a frame of a tractor between the front and rear wheels with the teeth of the harrow extending transversely beneath the tractor frame comprising a frame structure attached to the sides of the tractor frame and supporting a tubular member therebeneath to rotatably support a primary hitch member which is connected to a frame of the harrow. Secondary hitch members which are adjustable in length pivotally connected to the frame structure and to the frame of the harrow in vertical spaced relationship to the primary hitch member for maintaining the implement in a proper orientation when in either a transporting position or working position. In one embodiment of the invention, the tubular member is provided with mounting pads for pivotally mounting an implement such as a snow plow to transfer the pushing force of the tractor to the plow.

8 Claims, 5 Drawing Figures

INVENTOR.
Russell D. Yordy

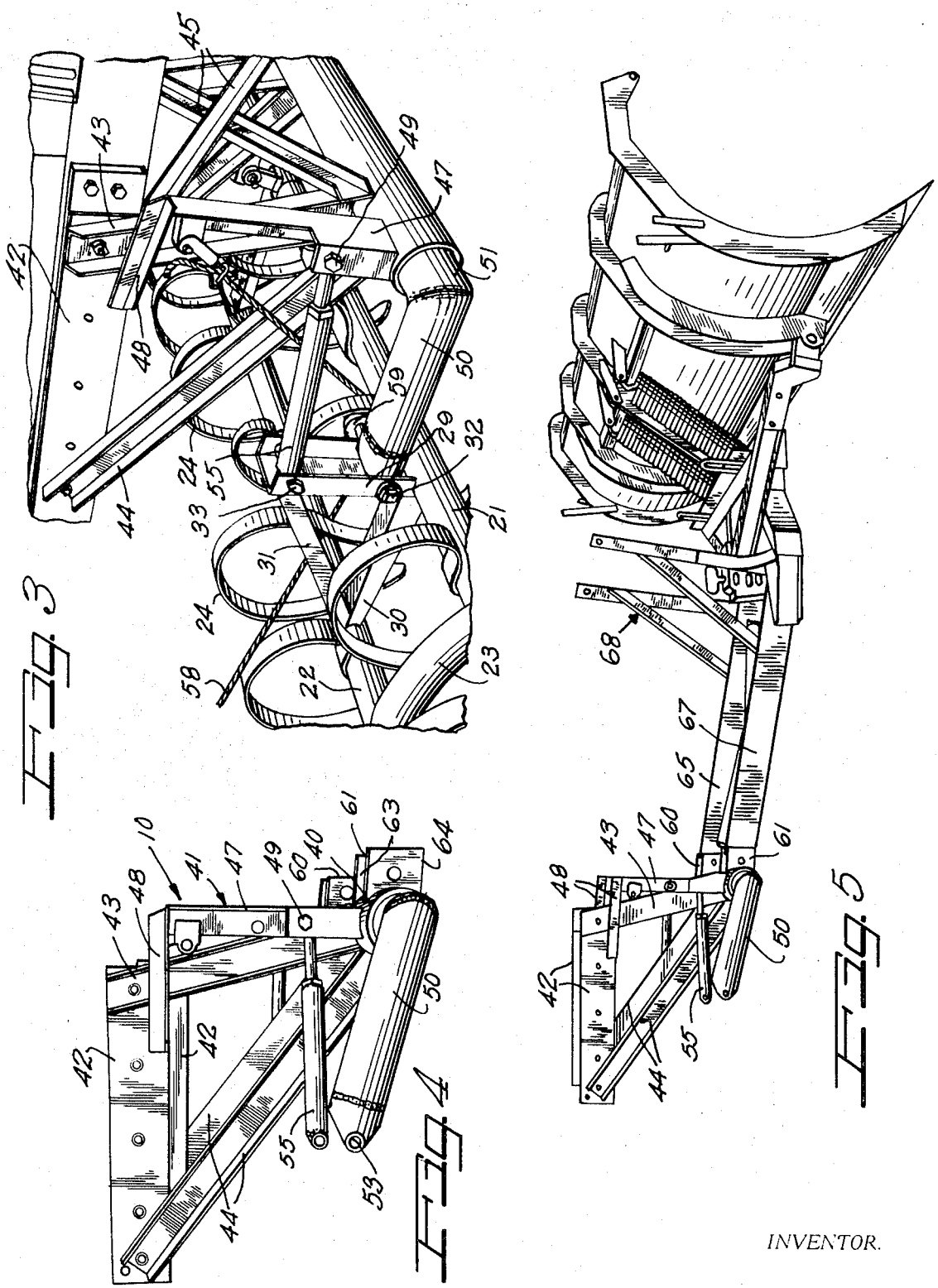

MOUNTING DEVICE

BACKGROUND OF THE INVENTION

1. Field of the Invention

The present invention is directed to a mounting device and particularly a mounting device for mounting an implement on a tractor ahead of the rear wheels.

2. Prior Art

Many implements such as cultivators for working the ground between rows of crops such as corn are mounted by a mounting structure on a tractor ahead of the rear wheels. In order to prevent damage to the crop during the cultivating operation, the main structural members of the mounting structure extends outwardly from the tractor frame in a horizontal direction and has horizontally spaced structural members extending down to the small plows or cultivator shoes. This type of mounting structure transfers the motive force of the tractor through the mounting structure and then down to the cultivator shoes at an angle which would result in both a vertical and horizontal force component. Due to the nature of the cultivating operation, the transmission of force to the shoes is of such a small amount that a waste of the pull power due to a vertical component is accepted and even desired to help prevent the shoes from digging too deep. In some of the mounting structures for cultivators, structure members do extend under the tractor frame and are usually tool bars which have an irregular cross-section so that a torque can be applied thereto to lift the cultivator shoes from the cultivating position to a transporting position. Even with the pull bar extending beneath the frame of the tractor, they are positioned adjacent thereto to provide the necessary clearance to prevent damage to any of the plants of the row crops.

Implements requiring a large amount of force to force them through the ground such as a plow have been mounted by mounting structure ahead of the rear wheels of the tractor. Such mounting structures utilize structural members attached to the rear axle or adjacent thereto of the tractor to apply a pushing force to the implement. In such a mounting device, the mounting structure has a heavy structure to provide a support for the plow in front of the rear wheel which structure will not buckle due to the forces applied thereto during a plowing operation.

SUMMARY OF THE INVENTION

The present invention is directed to a mounting device for attachment to a frame of a tractor behind the front wheels to provide a draw bar arrangement for drawing a farm implement extending transversely beneath the tractor and ahead of the rear wheels. The mounting device is preferably of a construction providing a frame for attachment to the sides of the frame of the tractor to support a drawbar member extending beneath the frame of the tractor adjacent the front wheels at a vertical distance from the frame so that a primary hitch member attached to an implement attached to the draw bar extends substantially parallel to the ground surface to reduce the vertical force component of the pulling force. The primary hitch members are preferably pivotally attached to the implement such as a spring tooth harrow and connected for rotation with respect to the drawbar. The supporting device also includes secondary hitch members pivotally attached to the frame in a vertical spaced relationship above the drawbar and having means for pivotally attaching to the frame of the implement to maintain it in the proper orientation while in a transporting position and in a working position. In one embodiment of the invention, the device is provided with mounting pads on the draw bar member for pivotally mounting arms of a front mounted implement such as a snow plow which is pushed by the tractor so that the pushing force applied to the snow plow is at a slight angle to the horizontal surface or parallel thereto.

Accordingly, an object of the present invention is to provide a hitch for mounting a pull-type implement such as a spring tooth harrow beneath the tractor frame between the front and rear wheels.

Another object of the present invention is to provide a mounting structure which transfers the pulling force of a tractor to a pull implement with the pulling force being substantially parallel to the ground surface.

A still further object of the present invention is to provide a mounting structure for a pull implement which positions the implement in a position easily seen by an operator of the tractor.

Yet another object of the present invention is to provide a mounting structure which provides means for transferring a pushing force to a device such as a snow plow which push force is transmitted in a direction substantially parallel to the ground surface.

A still further object of the present invention is to provide a heavy duty mounting structure for mounting a drawbar beneath a tractor frame between the front and rear wheels which structure is inexpensive to manufacture and easy to assemble on the tractor.

Other advantages, features and objects of the present invention will become manifest to those versed in the art on making reference to the detailed description accompanying the sheets of drawings in which the preferred embodiment covering the principles of the present invention is shown by way of illustrative example.

BRIEF DESCRIPTION OF THE DRAWINGS

FIG. 3 is a perspective view of a mounting device similar to the view of FIG. 2, illustrating the implement in a lowered position;

FIG. 4 is a side view of the mounting device of the present invention removed from a tractor; and FIG. 5 is a side view of the mounting device removed from a tractor illustrating attachments of a front mounted implement.

DESCRIPTION OF THE PREFERRED EMBODIMENTS

Figure 1:
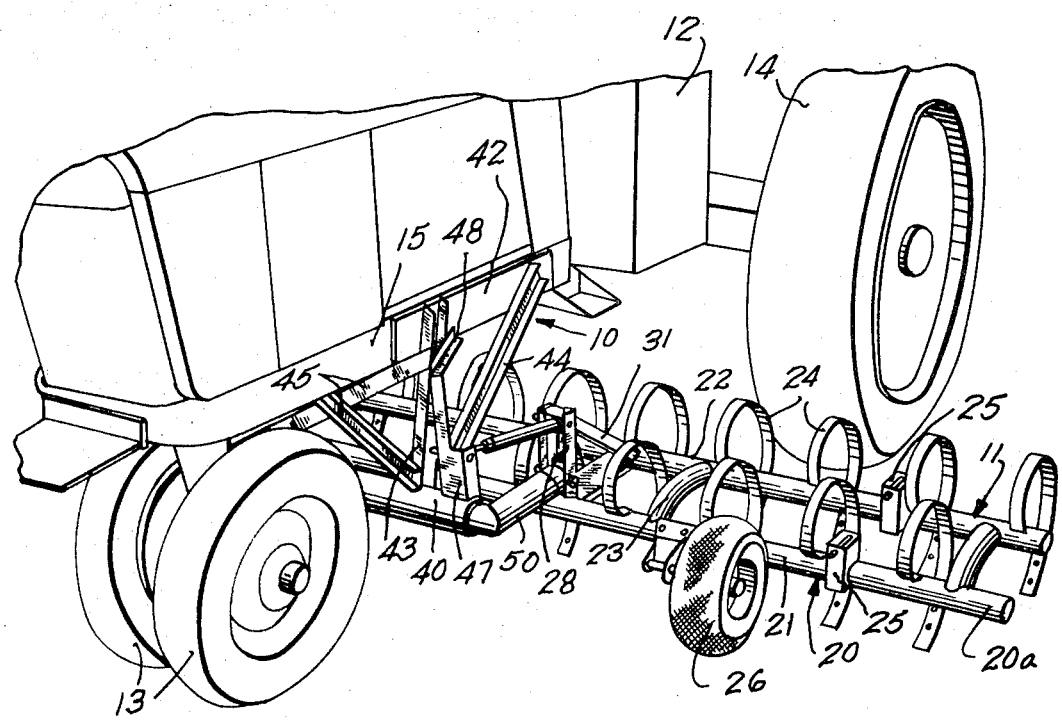
FIG. 1 is a partial perspective view of the present invention mounted on a tractor.

The principles of the present invention are particularly adapted in a mounting device generally indicated at 10 in FIG. 1 mounting a pull type implement such as a spring tooth harrow 11 beneath a tractor 12. The tractor 12 has a pair of front wheels 13 and a pair of rear wheels such as 14 with a tractor frame 15 extending therebetween. As illustrated, the mounting device 10 is attached to the frame 15 in a position between the front wheels 13 and the rear wheels 14 so that the implement operates on the ground ahead of the rear wheels 14.

Figure 2:
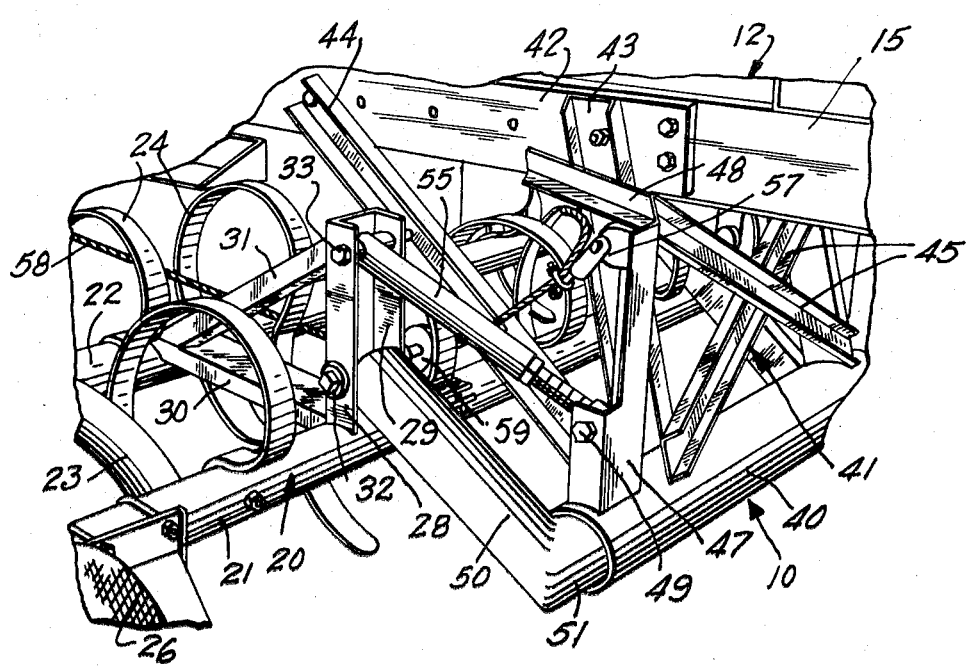
FIG. 2 is an enlarged perspective view taken on the other side of the tractor of the mounting device of the present invention with the implement in a raised position.

As illustrated in FIGS. 1 and 2, the implement 11 has a frame 20 comprising a front and rear parallel extending frame members 21 and 22 which are spaced apart by cross-members 23. The implement 11 has a plurality of spring teeth 24 mounted in spaced relationship along each of the members 21 and 22. In order to decrease the length of the frame 20 during transportations between fields, a pivotal connection 25 is provided on each of the parallel members 21 and 22 to enable an outboard portion 20a of the frame 20 to be folded back toward the center of the implement to reduce the transverse width thereof. To maintain the frame 20 at the desired height above the surface being worked, wheels such as 26 are provided and attached to the frame member 21 of the frame 20.

As best illustrated in FIG. 2, the frame 20 is provided with a traingular shaped mounting pad 28 which is formed by an upstanding channel member 29 attached to the forward parallel member 21, a channel type cross-member 30 extending between the members 21 and 22, and a brace 31 extending from the rear member 22 upward to the upper end of the member 29. The channel 29 has two pairs of aligned holes or apertures which are vertically spaced and adapted to receive bolts or pins 32 and 33 respectively.

The mounting device 10 has a draw bar member 40 which is mounted beneath the frame 15 of the tractor 12 by a frame structure generally indicated at 41. The frame structure 41 has a pair of side structures of a triangular configuration comprising a plate 42 attached to a side of the frame 15 of the tractor by appropriate means such as bolts. A front channel member 43 extends from the front end of the plate 42 and is attached to the draw bar member 40, and a rear channel member 44 extends from the opposite or rear end of the plate 42 to the member 40 to provide triangular bracing therefor. To interconnect the two side members of the frame structure 41, cross members 45 interconnect the two front channel members 43.

Adjacent each frame member 43 and spaced outwardly therefrom, an upstanding channel 47 is secured to the member 40 and has its upper end braced by an angularly extending member 48 which is attached to the plate 42 between the members 43 and 44. The upstanding member 47 has a pair of aligned openings for receiving a bolt such as 49 which pair of openings is vertically spaced above the member 40. As illustrated, the mounting structure 10 is a welded construction.

Rotatably supported on the draw bar member 40 are a pair of primary hitch members 50 which are spaced apart. Preferably the draw bar member 40 is a tubular member and the primary hitch member 50 are interconnected by a cylindrical member 51 which is supported and carried in the tubular draw bar 40. The cylindrical member 51 and pair of hitch members 50 have a U-shape configuration with the member 51 extending as arms from the member 51. At the outer ends of the arms, means such as sleeve or bushing (FIG. 4) 53 are provided for coacting with a bolt such as 32 in the holes or apertures in the upstanding channel 39 to form a pivotal connection with the frame 20.

To maintain the frame 20 at the proper orientation when either in a transporting position or the working position which orientation maintains the teeth 24 on both members 21 and 22 at the proper digging depth,
a secondary hitch member 55 is provided. The secondary hitch member 55 has means for pivotally connecting to the upstanding member 47 by the bolt 49 and to the channel member 29 by the bolt 33. As illustrated, the secondary hitch member 55 is two members interconnected by a threaded joint to vary its length to enable adjustment in the orientation of the frame 20 of the implement 11.

To enable raising and lowering of the implement 11 between the operating position and transporting position at least one of the upstanding members 47 is provided with a pad 57 (FIG. 2). The pad 57 provides an anchor for a cable 58 which passes under a pulley 59 attached to the frame 20 of the implement 11 and extends to means on the tractor for changing its length to raise and lower the implement.

As illustrated in FIG. 2, the implement 11 is in a raised condition with both the parallel members 21 and 22 substantially remaining in the same plane. While the implement 11 is in the raised condition, the secondary member 55 is in tension to prevent the frame 20 from tilting with the rear member 22 being lower than the forward member 21. As illustrated in FIG. 3, the implement 11 is in the operating position with the arm 51 being substantially parallel to the ground surface and with the member 55 being substantially parallel with the arm 51. In this position, the member 55 controls the orientation of the frame 20 so that the teeth on both the front member 21 and the rear member 22 are at the proper digging depth.

As illustrated in FIGS. 4 and 5, mounting pads 60 and 61 are provided on the tubular member 40 adjacent the upstanding member 47. The pads comprise a pair of parallel plates 63 and 64 having aligned holes to pivotally receive arms 65 and 67 respectively of an implement 68 which is of a blade configuration such as found in a snow plow construction.

In operation, with an implement such as 11, the mounting device 10 enables the mounting of the implement forward of the rear wheels 14 to work the ground as the tractor is passing thereover.

While the implement 11 is being pulled and engaging the ground, the major pulling force of the tractor is transferred via the frame structure 41 to the tubular member 40 through the primary hitch arms 50 to provide a pulling force which is substantially parallel to the ground surface and has substantially no vertical component. The secondary hitch members 55 maintain the frame 20 of the implement 11 in the proper orientation to regulate the depth of the teeth attached to the rear frame member 22.

As can be realized by viewing FIG. 1, there are several advantages of having the implement such as the spring tooth harrow 11 mounted ahead of the rear wheels 14. One advantage is that it enables the operator of the tractor 12 to have a better view of the operation of the implement on the ground while driving the tractor. Another advantage is that a second implement can be drawn behind the tractor 12 at the same time the spring tooth harrow 11 is being utilized and therefore saves additional trips through the field.

By mounting the draw bar 40 beneath the frame a substantial distance, the pulling forces for the implement 11 are substantially parallel and causes the implement 11 to operate correctly.

When using the mounting device 10 for an implement that is pushed ahead of the tractor such as the snow plow 68, the mounting device 10 transfers the force applied by the resistance to the snow plow to a portion of the frame 15 of the tractor 12. The mounting device 10 provides a mounting point for snow plow 68 which mounting point is between the front and rear wheels and thus transfers this reaction force to a point of high stability in the tractor configuration. The mounting point also enables the arms 65 and 67 to extend substantially parallel to the ground or only at a slight angle so that a limited amount of the force is applied in the vertical direction.

Although various minor modifications might be suggested by those versed in the art, it should be understood that I wish to employ within the scope of the patent warranted herein all such embodiments as reasonably and properly come within the scope of my contribution to the art.

I claim as my invention:

1. A mounting device for attachment to a frame or a tractor between the front and rear wheels thereof comprising
    a draw bar member,
    a frame structure including a pair of side structures of a triangular configuration, each of the side structures being secured to the draw bar member at spaced points thereon and having along a side, which is opposite to the point of attachment to the draw bar member, means for attaching the side structure to a side of the frame of the tractor behind the front wheels to support the draw bar member at a vertically spaced distance beneath the frame of the tractor in a following relationship to the front wheels and adjacent the ground surface; and
    a pair of primary hitch members rotatably connected to the draw bar member at spaced points and having means for forming a pivotal connection to a frame of a pull-type implement to position the implement ahead of the rear wheels of the tractor, said frame structure supporting the draw bar member at a substantial distance beneath the frame of the tractor so that while pulling the implement the primary hitch member extends substantially parallel to the ground surface a secondary hitch member having means at one end for forming a pivotal connection to the frame of the implement, the other end of the secondary hitch member being pivotally connected to the frame structure at a point spaced vertically above the draw bar member and below the means for attaching the side structure so that the secondary hitch member maintains the orientation of the implement.

2. A mounting device according to claim 1, wherein the secondary hitch member is adjustable in length to enable variations in the orientation of the frame of the implement.

3. A mounting device according to claim 1, wherein the draw bar member is a tubular member, and wherein the pair of primary hitch members are interconnected by a cylindrical member supported in the tubular member, said pair of primary hitch members and cylindrical members having a U-shape configuration.

4. A mounting device according to claim 1, wherein the implement has a plurality of digging means arranged on the frame of the implement in at least two spaced rows, which device includes a secondary hitch member associated with each of the pair of primary hitch members, each secondary hitch member being pivotally connected to the frame structure at a point spaced vertically above the respective primary hitch members and below the means for attaching the side structure, each of said secondary hitch members having means for forming a pivotal connection with the frame of the implement to maintain the frame in the desired orientation in both a transporting position and a working position which orientation at the working position maintains the desired digging depth of all of the rows of the digging means.

5. A mounting device according to claim 11, wherein each of said side structures includes the plate member and at least two frame members secured to the draw bar member and to the plate member to provide the triangular configuration.

6. A mounting device according to claim 5, wherein said draw bar member includes a pair of mounting pads for receiving a pair of arms of a push type implement mounted ahead of the front wheels of the tractor so that the movement of the tractor is transferred through the draw bar member to the push type implement.

7. A mounting device according to claim 4 wherein each of said pair of secondary hitch members has means for adjusting its length so that the orientation of the frame of the implement can be varied.

8. A mounting device according to claim 7, wherein said draw bar member is a tubular member extending transverse to the frame of the tractor, and wherein said pair of primary hitch members are interconnected by a cylindrical member rotatably received in said tubular member with the primary hitch members extending at right angles to the draw bar member adjacent each end thereof.

* * * * *